(12) United States Patent
Ishikawa (10) Patent No.: US 7,188,606 B2
(45) Date of Patent: Mar. 13, 2007

(54) DIESEL ENGINE

(75) Inventor: Naoya Ishikawa, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 63 days.

(21) Appl. No.: 11/068,953

(22) Filed: Feb. 28, 2005

(65) Prior Publication Data

US 2005/0193978 A1    Sep. 8, 2005

(30) Foreign Application Priority Data

Mar. 2, 2004    (JP)    ............................. 2004-057556

(51) Int. Cl.
*F02D 11/10* (2006.01)
*F02M 25/07* (2006.01)

(52) U.S. Cl. ................. 123/399; 123/568.21; 60/605.2

(58) Field of Classification Search .......... 123/568.21, 123/399; 60/602, 605.1, 605.2
See application file for complete search history.

(56) References Cited

U.S. PATENT DOCUMENTS

| | | | |
|---|---|---|---|
| 5,749,334 A | | 5/1998 | Oda et al. |
| 5,890,360 A | * | 4/1999 | Sasaki et al. ................. 60/278 |
| 5,937,639 A | * | 8/1999 | Sasaki et al. ................. 60/278 |
| 6,209,516 B1 | | 4/2001 | Yamashita |
| 6,782,696 B2 | * | 8/2004 | Shigahara et al. ............ 60/285 |
| 6,857,263 B2 | * | 2/2005 | Gray et al. .................... 60/278 |
| 6,886,334 B2 | * | 5/2005 | Shirakawa .................... 60/602 |
| 6,932,048 B2 | * | 8/2005 | Shimazaki .................. 123/299 |
| 6,994,077 B2 | * | 2/2006 | Kobayashi et al. ..... 123/568.11 |
| 7,007,463 B2 | * | 3/2006 | Shirakawa .................... 60/297 |

FOREIGN PATENT DOCUMENTS

| | | |
|---|---|---|
| JP | 2000-130200 | 5/2000 |
| JP | 2000-248985 | 9/2000 |
| JP | 2001-020784 | 1/2001 |
| JP | 2002-327638 | 11/2002 |

* cited by examiner

*Primary Examiner*—Stephen K. Cronin
*Assistant Examiner*—Arnold Castro
(74) *Attorney, Agent, or Firm*—McCormick, Paulding & Huber LLP (57) ABSTRACT

A diesel engine comprises an EGR valve, an intake throttle valve, a control unit for controlling those EGR valve and intake throttle valve, and a detection unit for detecting the intake air quantity upstream of an EGR gas inlet portion, the diesel engine implementing a premix combustion at least in the prescribed operation region. The control unit, at least in the operation region in which the premix combustion is implemented, determines a target intake air quantity necessary for igniting the gas mixture at the target timing based on the engine operation state and controls the intake throttle valve and/or EGR valve so that the actual intake air quantity detected by the detection unit matches the target intake air quantity. As a result, the ignition timing of the fuel in premix combustion can be easily and optimally controlled.

15 Claims, 5 Drawing Sheets

DIESEL ENGINE

CROSS REFERENCE TO RELATED APPLICATION

The applicant hereby claims foreign priority benefits under U.S.C. § 119 of Japanese Patent Application No. 2004-57556 filed on Mar. 2, 2004, and the content of which is herein incorporated by reference.

BACKGROUND OF THE INVENTION

1. Field of the Invention

The present invention relates to a diesel engine in which premix combustion is implemented, and more particularly to a diesel engine with optimized fuel ignition timing in the premix combustion.

2. Description of the Related Art

In diesel engines, fuel is typically injected close to a compression top dead center of the piston when the temperature and pressure inside the cylinder are high. The injected fuel is mixed with the intake air, forming a mixture, this mixture is ignited producing a flame, and the combustion is maintained by supplying subsequently injected fuel into this flame. In other words, ignition starts during fuel injection.

By contrast, a combustion system called "premix combustion" in which the fuel injection timing is set earlier than the compression top dead center has recently been suggested (for example, see Japanese Patent Applications Laid-open Nos. 2001-20784 and 2002-327638). In the premix combustion, the combustion is started due to initiation of thermal decomposition or oxidation reaction of the fuel accompanying the increase in temperature inside the cylinder in the course of the compression cycle after the end of fuel injection. In other words, the compression self-ignition proceeds once a certain interval elapses after the end of fuel injection. As a result, the mixture is sufficiently leaned and homogenized. Therefore, local combustion temperature decreases and the amount of released NOx(nitrogen oxide) is decreased. Furthermore, the emission of smoke is also inhibited because local combustion is in an air shortage state.

The premix combustion was thus, effective for improving the exhaust gas, but the problem associated therewith was that the fuel ignition timing was difficult to control. This can be explained as follows. In the conventional combustion systems in which ignition starts in the course of fuel injection, the ignition timing can be controlled by controlling the fuel injection timing, but in the premix combustion there is a premixing interval (interval from the end of fuel injection to ignition). Therefore, the ignition timing cannot be fully and stringently controlled by controlling the fuel injection-timing.

In the case of inadequate ignition timing of the fuel (mixture) in the premix combustion, not only the exhaust gas purification effect cannot be obtained, by also the efficiency degradation (fuel consumption deterioration) or combustion noise are generated. For example, when the fuel ignition timing is too early (before the compression top dead center), heat loss is increased and compression with the piston is received after the ignition has been started. As a result, the temperature inside the cylinder increases and there is a risk of NOx generation.

Therefore, it is important to control adequately the ignition timing of fuel during premix combustion.

Japanese Patent Application Laid-open 2002-327638 described a diesel engine comprising a variable supercharger with an adjustable boot pressure and an EGR unit, wherein the target intake air quantity necessary to ignite the fuel at the optimum timing is set for each engine operation state, and the boost pressure and EGR ratio are adjusted so that the actual intake air quantity becomes the target intake air quantity.

However, when the boost pressure was changed to control the intake air quantity, there was a risk of degrading the fuel consumption or producing a negative effect on boost pressure rise during acceleration when the boost pressure failed to correspond to the engine operation state.

Furthermore, because the EGR (exhaust gas recirculation) ratio and intake air quantity change if the boost pressure is changed, it is necessary to control the boost pressure in cooperation with the EGR ratio. Thus, there was a problem that it is difficult to control the intake air quantity. In other words, the intake air quantity is not easy to control to a target value because changes in the intake air quantity caused by changes in the boost pressure and changes in the intake air quantity caused by changes in the EGR ratio are intertwined in a complex manner.

SUMMARY OF THE INVENTION

It is an object of-the present invention to resolve the above-described problems and to provide a diesel engine in which the ignition timing of fuel in premix combustion can be easily and optimally controlled.

In order to attain the above-described object, the present invention provides a diesel engine comprising an EGR valve, an intake throttle valve provided upstream of an EGR gas inlet portion in an intake channel, control means for controlling those EGR valve and intake throttle valve, and intake air quantity detection means for detecting the intake air quantity upstream of an EGR gas inlet portion in the intake channel, this diesel engine implementing a premix combustion in which a fuel is injected earlier than the compression top dead center at least in the prescribed operation region and the compressed self ignition is performed after the injection is completed, wherein the control means, at least in the operation region in which the premix combustion is implemented, determines a target intake air quantity necessary for igniting the fuel at the target timing based on an engine operation state and controls the intake throttle valve and/or EGR valve so that the actual intake air quantity detected by the intake air quantity detection means matches the target intake air quantity.

Here, the target values of at least any one of the quantity of oxygen, oxygen concentration, air/fuel ratio, EGR ratio, and inert gas concentration necessary for the fuel to be ignited at the optimum timing, or a combination of two or more thereof, or other physical parameters corresponding thereto may be determined for each engine operation state, and the target intake air quantity may be determined such that at least any one of the quantity of oxygen, oxygen concentration, air/fuel ratio, EGR ratio, and inert gas concentration, or a combination of two or more thereof, or other-physical parameters corresponding thereto match the target values.

Further, the control means may fix the opening degree of the EGR valve and control the opening and closing of only the intake throttle valve when the target intake air quantity is equal to or less than a first set value. The control means may control the opening of both the EGR valve and the intake throttle valve when the target intake air quantity is larger than the first set value and equal to or less than a second set value. The control means may fix the opening degree of the intake throttle valve and control the opening of only the EGR valve when the target intake air quantity is larger than the second set value.

Further, the control means may fix the opening degree of the EGR valve to a full open state and control the opening of only the intake throttle valve when the target intake air quantity is equal-to or less than-the first set value. The control means may fix the opening degree of the intake throttle valve to a full open state and control the opening of only the EGR valve when the target intake air quantity is larger than the second set value.

Further, the diesel engine may further comprise a variable supercharger equipped with boost pressure adjustment means, wherein the control means may control the boost pressure adjustment means according to a map that was set in advance, irrespectively of the target intake air quantity.

Further, the control means may make a control amount of the boost pressure adjustment means constant in the operation region where the premix combustion is implemented.

Further, the boost pressure adjustment means may comprise a boost pressure adjustment valve for changing the flow rate of exhaust gases introduced into an exhaust turbine provided in an exhaust channel, and the control means may fix the boost pressure adjustment valve to a fully closed state in the operation region where the premix combustion is implemented.

In another mode of the present invention, there is provided a control method for a diesel engine comprising an EGR valve, an intake throttle valve provided upstream of an EGR gas inlet portion in an intake channel, control means for controlling those EGR valve and intake throttle valve, and intake air quantity detection means for detecting the intake air quantity upstream of an EGR gas inlet portion in the intake channel, this diesel engine implementing a premix combustion in which a fuel is injected earlier than the compression top dead center at least in the prescribed operation region and the compressed self ignition is performed after the injection is completed, the method comprising the steps of determining a target, intake air quantity necessary for igniting-the fuel at the target timing based on an engine operation state, and controlling the intake throttle valve and/or EGR valve so that the actual intake air quantity detected by the intake air quantity detection means matches the target intake air quantity.

In another mode of the present invention, there is provided a diesel engine comprising an EGR valve, an intake throttle valve provided upstream of an EGR gas inlet portion in an intake channel, control means for controlling those EGR valve and intake throttle valve, and oxygen quantity detection means for detecting the oxygen quantity in the gas mixture, this diesel engine implementing a premix combustion in which a fuel is injected earlier than the compression top dead center at least in the prescribed operation region and the compressed self ignition is performed after the injection is completed, wherein the control means, at least in the operation region in which-the premix combustion is implemented, determines a target oxygen quantity necessary for igniting the fuel at the target timing based on an engine operation state and controls the intake throttle valve and/or EGR valve so that the actual oxygen quantity detected by the oxygen quantity detection means matches the target oxygen quantity.

In yet another mode of the present invention, there is provided control method for a diesel engine comprising an EGR valve, an intake throttle valve provided upstream of an EGR gas inlet portion in an intake channel, control means for controlling those EGR valve and intake throttle valve, and oxygen quantity detection means for detecting the oxygen quantity in the gas mixture, this diesel engine implementing a premix combustion in which a fuel is injected earlier than the compression top dead center at least in the prescribed operation region and the compressed self ignition is performed after the injection is completed, the method comprising the steps of determining a target oxygen quantity necessary for igniting the fuel at the target timing based on the engine operation state, and controlling the intake throttle valve and/or EGR valve so that the actual oxygen quantity detected by the oxygen quantity detection means matches the target oxygen quantity.

BRIEF DESCRIPTION OF THE INVENTION

DESCRIPTION OF THE PREFERRED EMBODIMENTS

A preferred embodiment of the present invention will be described below With reference to the appended drawings.

Figure 1:
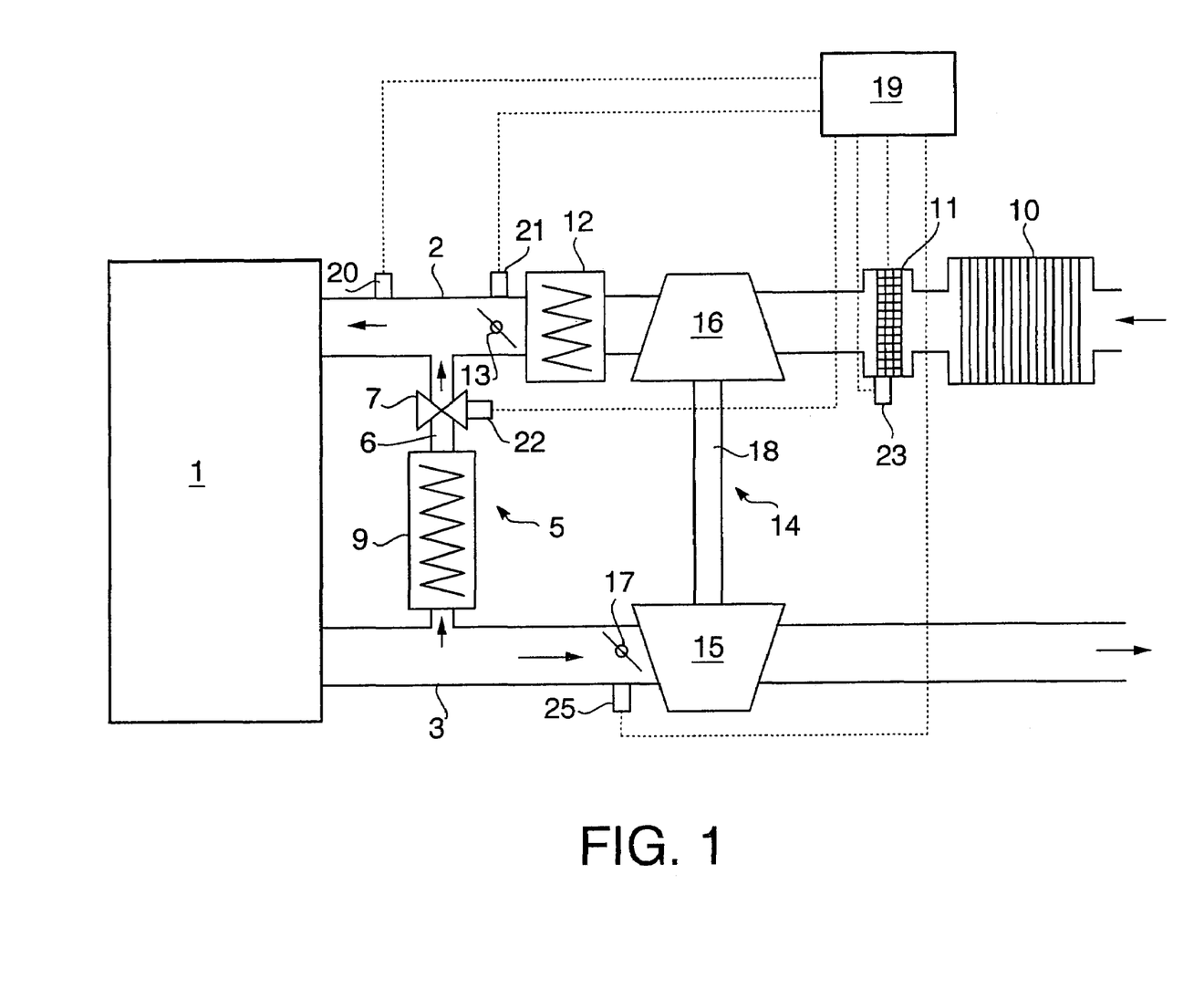
FIG. 1 is a schematic view of a diesel engine relating to an embodiment of the present invention.

FIG. 1 is a schematic view of a diesel engine of the embodiment.

In the figure, the reference numeral 1 stands for an engine body. The engine body 1 is connected to an intake channel 2 and an exhaust channel 3. The diesel engine of the present embodiment comprises an EGR (exhaust gas recirculation) unit 5 for returning part of exhaust gas into the combustion chamber of the engine body. The EGR unit 5 comprises an EGR (exhaust gas recirculation) channel 6 connecting the intake channel 2 and exhaust channel 3, an EGR (exhaust gas recirculation) valve 7 for changing the EGR (exhaust gas recirculation) ratio or EGR (exhaust gas recirculation) quantity (simply referred to hereinbelow as "EGR ratio") by changing the channel surface area of the EGR (exhaust gas recirculation) channel 6, and an EGR cooler 9 for cooling the EGR gas.

In the intake channel 2, an air cleaner 10, a MAF (mass air flow) sensor 11 (intake air quantity detection means) for detecting the quantity of air (MAF) that passed through the air cleaner 10, an intercooler 12 for cooling the intake air, and an intake throttle valve 13 for changing the intake air quantity (new air flow rate) upstream of the connection portion (EGR gas introduction portion) of the EGR channel 6 and intake channel 2, are provided. The MAF sensor 11 is provided upstream of the EGR gas introduction portion and detects the flow rate of intake air (new gas) containing no EGR gas.

A variable-capacity turbo 14 (variable supercharger) is provided in the intake channel 2 and exhaust channel 3.

Thus, an exhaust gas turbine 15 is provided downstream of the connection portion of the EGR channel 6 in the exhaust channel 3, and a compressor 16 is provided upstream of the intake throttle valve 13 in the intake channel 2. Those exhaust gas turbine 15 and compressor 16 are linked together via a rotary shaft 18. A boost pressure adjustment valve 17 (boost pressure adjustment means) for changing the flow rate of the exhaust gas introduced into the exhaust gas turbine 15 is provided on the inlet side of the exhaust gas turbine 15, and the boost pressure of the intake air that is created by the compressor 16 can be adjusted by changing the valve opening degree of the boost pressure adjustment valve 17.

An ECU (electronic control unit) 19 (control means) is provided for electronic control of the diesel engine. The ECU 19 detects the operation state of the engine from various sensors provided in the diesel engine and controls the fuel injection system of the engine body 1, EGR valve 7, intake throttle valve 13 and boost pressure adjustment valve 17 based on the engine operation state. The various sensor includes a boost pressure sensor 20 for detecting the boost pressure in the intake channel 2, a position sensor 21 for detecting the opening degree of the intake throttle valve 13, a position sensor 22 for detecting the valve opening degree of the EGR valve 7, a temperature sensor 23 for detecting the temperature of the intake air (new air) flowing in the MAF sensor 11, a position sensor 25 for detecting the valve opening degree of the boost pressure adjustment valve 17, an engine revolution sensor (not shown in the figure) for detecting the revolution speed of the crank shaft of the engine body 1, and an accelerator opening degree sensor (not shown in the figure) for detecting the accelerator opening degree. The detected values of each sensor are inputted into the ECU 19.

A map having the fuel injection timing, fuel injection quantity, and fuel injection pressure set therein is stored in advance for each engine operation state (engine revolution speed, accelerator opening degree, and the like) in the ECU 19. The ECU 19 determines the target values of the fuel injection timing, fuel injection quantity and fuel injection pressure from the map based on the actual engine operation state detected by the sensors and adequately controls the fuel injection system (not shown in the figure) based on the target values.

The diesel engine of the present embodiment implements the above-described premix combustion at least in the prescribed engine operation region (operation state). In other words, the ECU 19 implements fuel injection prior to the compression top dead center in the prescribed operation region, and the fuel (gas mixture) is compressed and self-ignites after the fuel injection has been completed. As described hereinabove, with the premix-combustion, leaning and homogenization of the gas mixture are enhanced and NOx (nitrogen oxide) and smoke can be greatly reduced.

Further, in the diesel engine of the present embodiment, measures have been taken to ensure that the ignition timing of fuel is easily and optimally controlled at least in the operation region where the premix combustion is implemented. Thus, the ECU 19, at least in the operation region where the premix combustion is implemented, determines the target intake air quantity (new gas quantity) necessary for igniting the fuel or mixture (intake air (new gas)+EGR gas+fuel) at the target timing (optimum timing) based on the engine operation state, feedback controls the valve opening degree of the intake throttle valve 13 and/or EGR valve 7 correspondingly to the actual intake air quantity detected by the MAF sensor 11, and matches the actual intake air quantity with the target intake air quantity.

More specifically, in the premix combustion, there is an optimum mixture ignition timing (basically, the compression top dead center or immediately after it) such that an exhaust gas purification effect can be obtained and no adverse effect such as efficiency degradation or noise generation is produced. Further, in the premix combustion, the ignition timing of the mixture changes depending on the fuel ignition timing, fuel ignition quantity, and oxygen concentration in the mixture. Furthermore, oxygen concentration can be replaced with oxygen quantity, air/fuel ratio, EGR ratio or quantity, inert gas concentration, or other physical parameters corresponding thereto, but here the explanation will be conducted by using oxygen concentration as a representative physical parameter. As described hereinabove, the fuel injection timing and fuel injection quantity are uniquely determined by the engine operation state, and the oxygen concentration (target oxygen concentration) necessary for igniting the mixture at the target optimum timing can be determined by a test or simulation for each engine operation state.

Further, the oxygen concentration in the mixture depends of the intake air quantity (new gas quantity). Therefore, the intake air quantity (target intake air quantity) necessary to obtain the above-described target oxygen concentration is determined by a test or simulation and stored as a map in advance in the ECU 19.

Because the actual intake air quantity varies according to the valve opening degree of the intake throttle valve 13 and EGR 7, the ECU 19 determines the target intake air quantity from the map based on the actual engine operation state and then feedback controls the valve opening degree of the intake throttle valve 13 and/or EGR valve 7 so that the actual intake air quantity detected by the MAF sensor 11 matches the target intake air quantity. As a result, the ignition timing of the fuel (mixture) in the premix combustion can be always optimally controlled. Therefore, a sufficient exhaust gas purification effect can be obtained and negative effects accompanying an inadequate ignition timing, such as efficiency degradation or noise generation, can be avoided.

Here, an important aspect is that the diesel engine in accordance with the present invention does not use the boost pressure adjustment valve 17 for controlling the intake air quantity. In other words, in the diesel engine of the present embodiment, the ECU 19 stores separately the map in which the optimum valve opening degree of the boost pressure adjustment valve 17 is set for each engine operation state (engine revolution speed, fuel injection quantity, and the like), and the ECU 19 controls the valve opening degree of the boost pressure adjustment valve 17 according to the map, irrespectively of the above-described target intake air quantity. Therefore, the boost pressure is always at a level matching the engine operation state and no degradation of fuel consumption or negative effect on boost pressure increase during acceleration are induced. Further, if the valve opening degree of the boost pressure adjustment valve 17 changes, the intake air quantity also changes, but this change can be compensated (absorbed) by the feedback control of the intake throttle valve 13 and/or EGR valve 7. Therefore, the target intake air quantity can be reliable matched with the actual intake air quantity.

Figure 2:
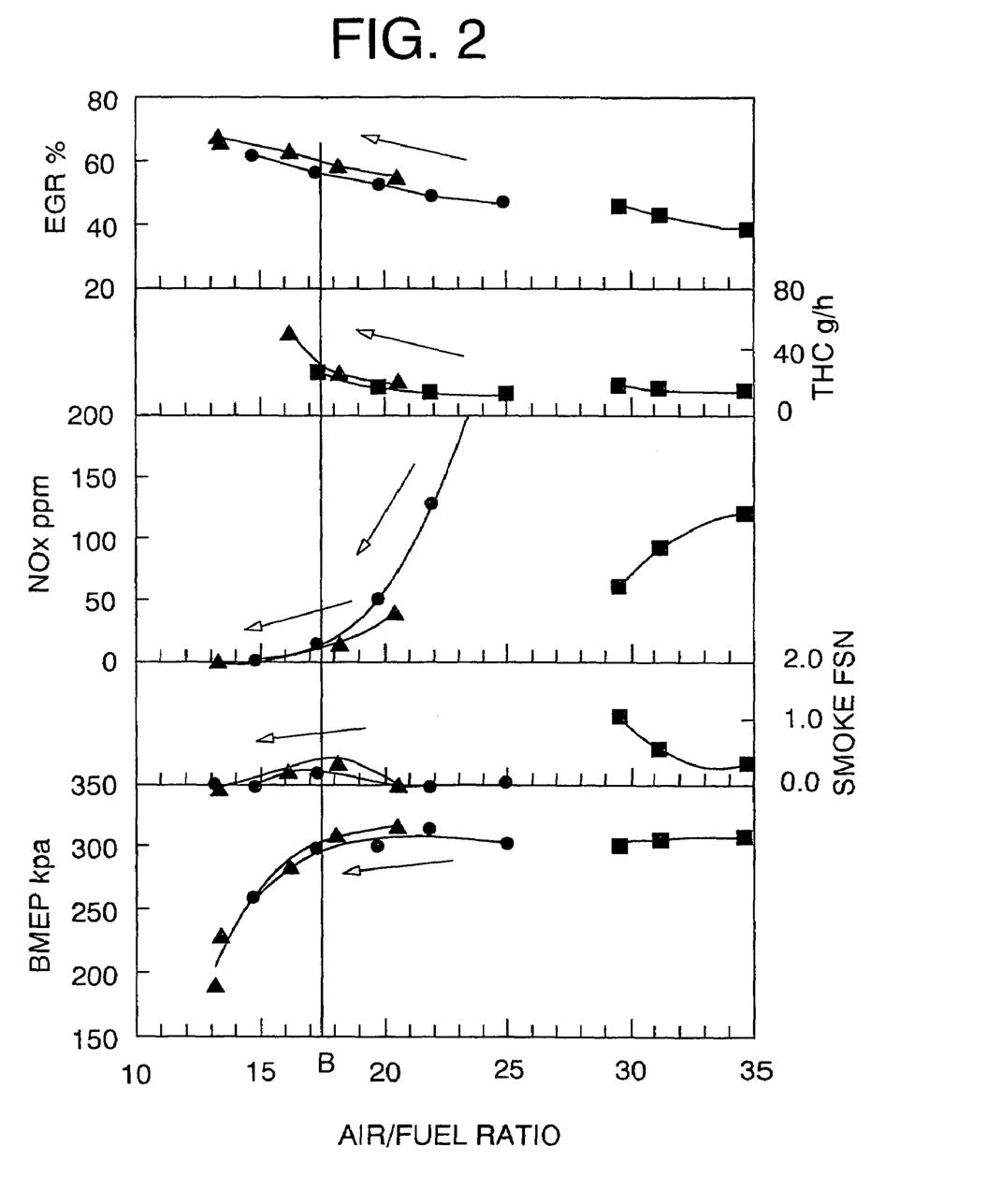
FIG. 2 illustrates the relationship between the air/fuel ratio (intake air quantity), exhaust gas characteristic, and engine performance.

The relationship between the intake air quantity, exhaust gas characteristic, and engine performance is shown in FIG. 2.

In the figure, the air/fuel ratio as a representative value indicating the intake air quantity is plotted against the ordinate; it means that the higher is the air/fuel ratio, the larger is the intake air quantity (but the fuel injection quantity is constant). The EGR ratio, THC (total hydrocarbon), exhaust quantity, NOx (nitrogen oxide) exhaust quantity, smoke exhaust quantity, and brake mean effective pressure (BMEP) are plotted on the ordinate in the figure, in the order of description starting from the upper section.

This figure shows the results obtained by varying the air/fuel ratio (intake air quantity) by changing only the valve opening degree of the intake throttle valve 13, while fixing the valve opening degree of the EGR valve 7. The line connecting the white points represents the case where the valve opening degree of the EGR valve 7 was fixed at 20%, and the line connecting the triangular points represents the case where the valve opening degree of the EGR valve 7 was fixed at 40%. The line connecting rectangular points in the figure indicates, for the reference, the results obtained when the conventional combustion was conducted by injecting the fuel in the compression upper dead center of the piston. The engine revolution speed and fuel injection quantity are constant for all the lines. In each line, the direction shown by an arrow indicates the decrease in the valve opening degree of the intake throttle valve 13.

As follows from the figure, if the valve opening degree of the intake throttle valve 13 decreases, the air/fuel ratio decreases, that is, the intake air quantity decreases and the EGR ratio increases.

Further, if the valve opening degree of the intake throttle valve 13 changes, the amount of generated THC (total hydrocarbon), NOx (nitrogen oxide), and smoke also changes. This is because changes in the valve opening degree of the intake throttle valve 13 cause changes in the oxygen concentration in the mixture (or air/fuel ratio or intake air quantity) and changes in the fuel ignition timing.

Further, as shown in the figure, there is an optimum air/fuel ratio B ensuring the same level of engine performance as with the conventional combustion and a small total amount of discharged polluting substances. In other words, the ignition timing of the mixture at the time of this air/fuel ratio B is the above-described target ignition timing (optimum ignition timing), and the intake air quantity corresponding to this air/fuel ratio B is a target intake air quantity.

Figure 3:
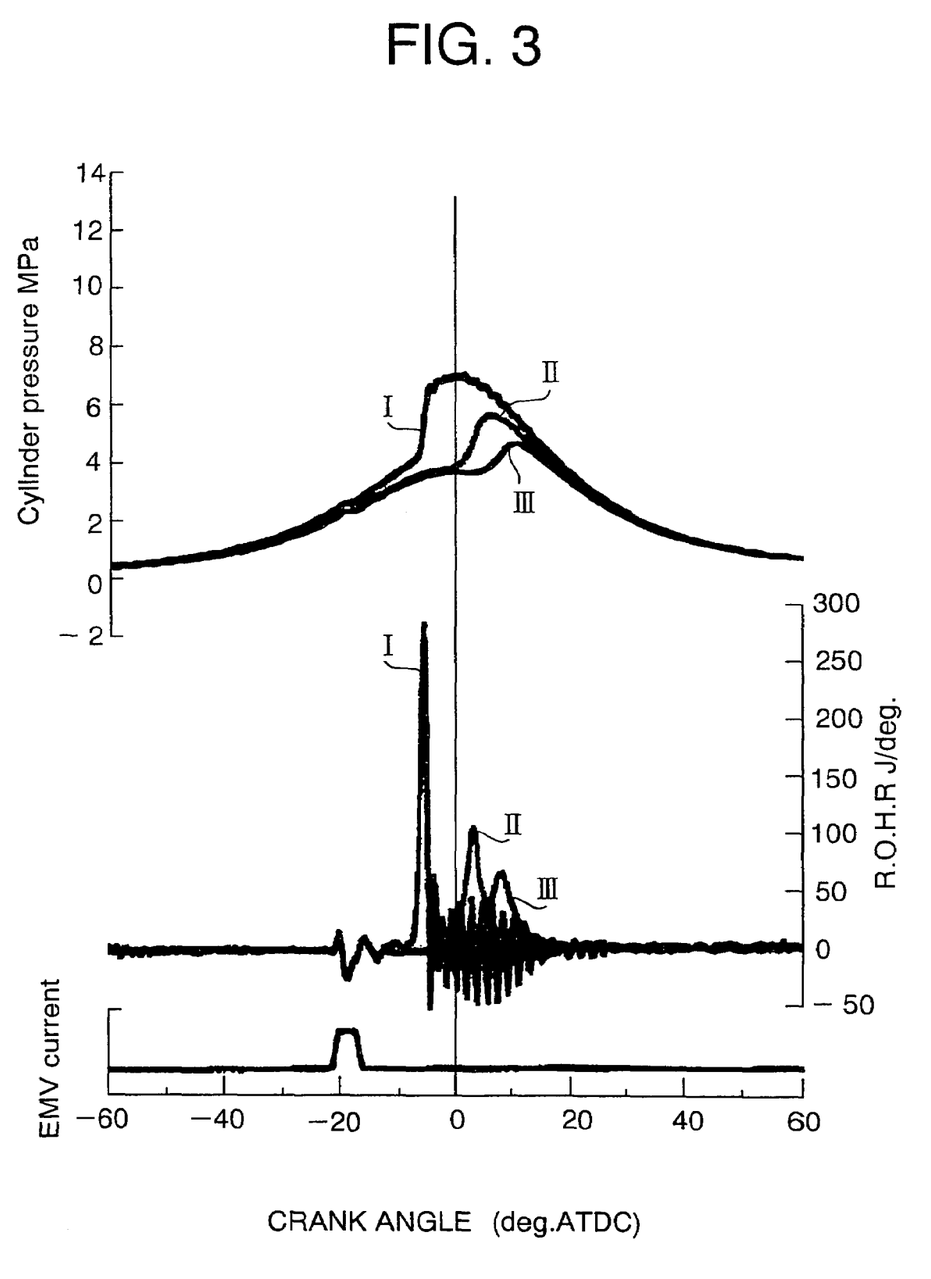
FIG. 3 illustrates the relationship between the valve opening degree of an intake throttle valve 13, pressure inside cylinders, and heat generation ratio.

An example of the relationship between the valve opening degree (in other words, the intake air quantity) of the intake throttle valve 13 and the ignition timing is shown in FIG. 3.

In the figure, the crank angle is plotted against the abscissa. The pressure inside the cylinder is shown in the upper part, the heat generation ratio is shown in the medium part, and the application timing of the conduction current (drive current) corresponding to the fuel injection valve of the engine body 1 is shown in the lower part of the ordinate.

This figure illustrates an example in which fuel injection was implemented at −20 ATDC. Here, the valve opening degree of the EGR valve 7 was fixed at 20%. Further, it means that the valve opening degree of the intake throttle valve 13 decreases with the transition from line I to line III. In other words, FIG. 3 shows the results obtained when the valve opening degree of the intake throttle valve 13 changed to pattern 3.

As follows from the figure, the decrease in the valve opening degree of the intake throttle valve 13 delays the period at which the pressure inside the cylinder and heat generation ratio start rising. This result means that when the valve opening degree of the intake throttle valve 13 decreases, that is, when the intake air quantity decreases, the ignition timing of the gas mixture becomes delayed. Furthermore, it is clear that as the ignition timing of the gas mixture becomes delayed, the maximum values of the pressure inside the cylinder and heat generation ratio become smaller.

This result demonstrates that the ignition timing-and combustion of the mixture can be controlled by controlling the valve opening degree of the intake throttle valve 13.

The intake air quantity necessary for igniting the gas mixture at the target timing differs between the operation modes of the engine. For this reason, the intake air quantity necessary for igniting the gas mixture at the target timing is found in advance for each operation mode of the engine by a test or simulation and stored as a target intake air quantity map in the ECU 19.

Figure 4:
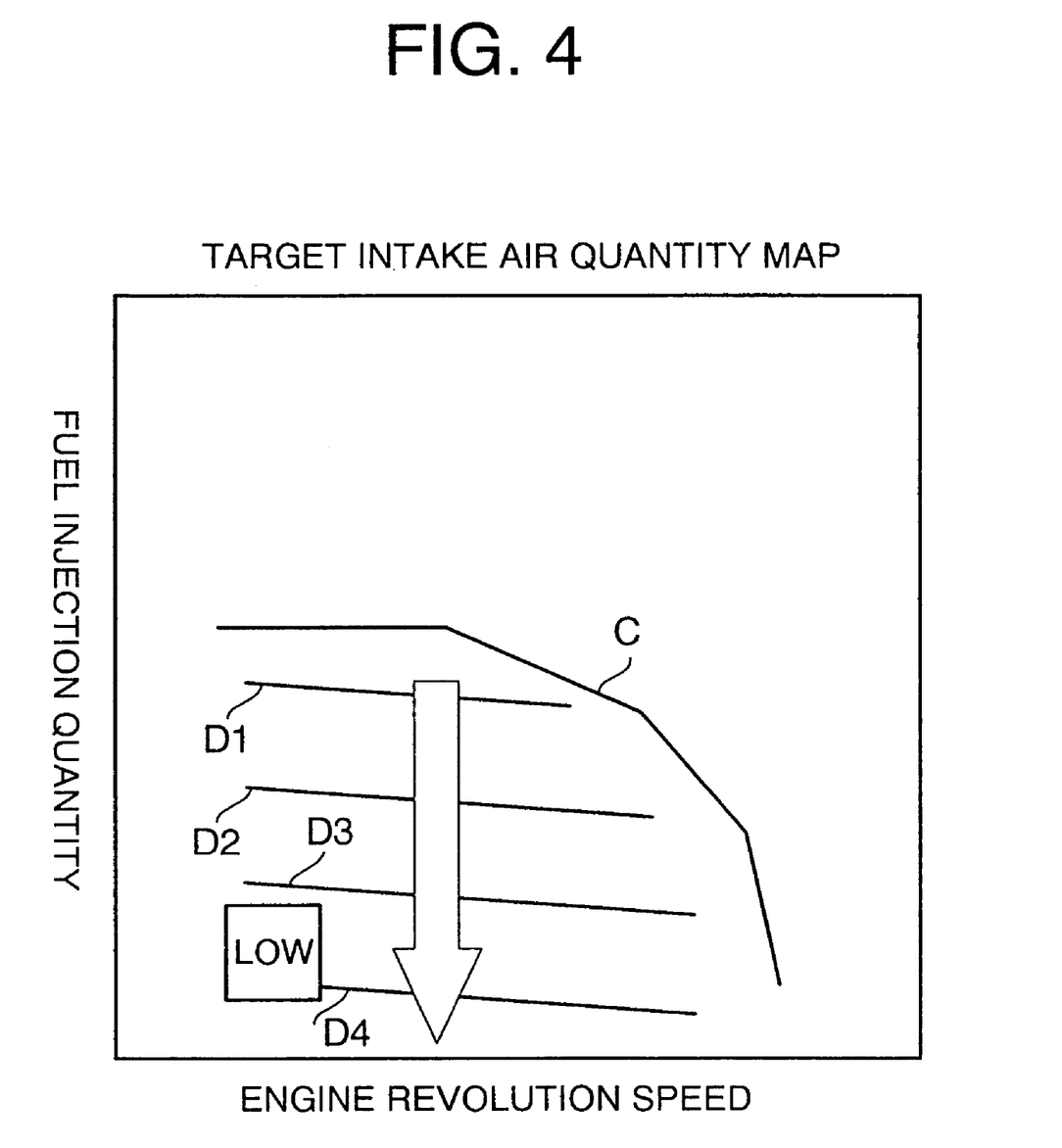
FIG. 4 is an example of a target intake air quantity map.

An example of the target intake air quantity map is shown in FIG. 4.

In the figure, the engine revolution speed is plotted against the abscissa, and the fuel injection quantity (corresponds to the engine load) is plotted against the ordinate. Further, line C shows a switching point between the premix combustion and usual diffusion combustion. The ECU 19 implements the premix combustion in the operation region below the line C. In other words, in the present embodiment, the premix combustion is implemented in the operation region with a comparatively low load. This is because, the fuel injection quantity increases in the high-load operation region and, therefore, there is a risk of the premix combustion generating knocking.

Further, lines D1 to D4 disposed below the line C represent the target intake air quantity map. When they are on the same line, it means that the target intake air quantities are equal to each other. As follows from the figure, as the fuel injection quantity decreases (as the engine load decreases), the target intake air quantity decreases.

The ECU 19 determines the target intake air quantity from the map based on the actual engine revolution speed detected by the engine revolution sensor and a fuel injection quantity determined from a map based on the engine revolution speed and accelerator opening degree.

The control of the intake throttle valve 13 and/or EGR valve 7 is so conducted that the actual intake air quantity detected by the MAF sensor 11 matches the target air intake quantity, but in the present embodiment the valve to be controlled is selected based on the value of the target intake air quantity determined from the map.

This procedure will be explained, by using FIGS. 5a to 5c.

Figure 5A:
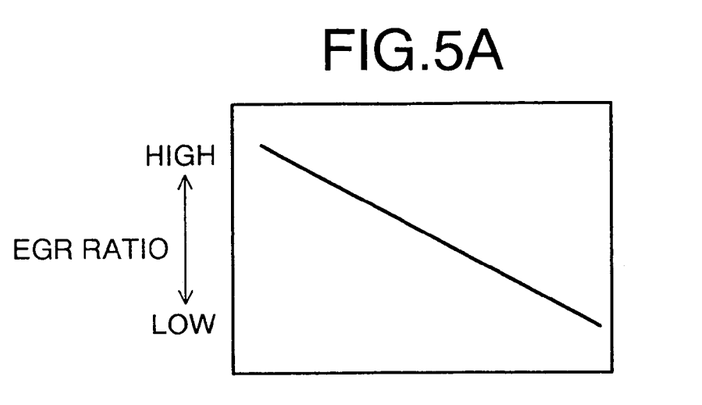
FIG. 5a illustrates the relationship between the intake air quantity and EGR ratio.
Figure 5B:
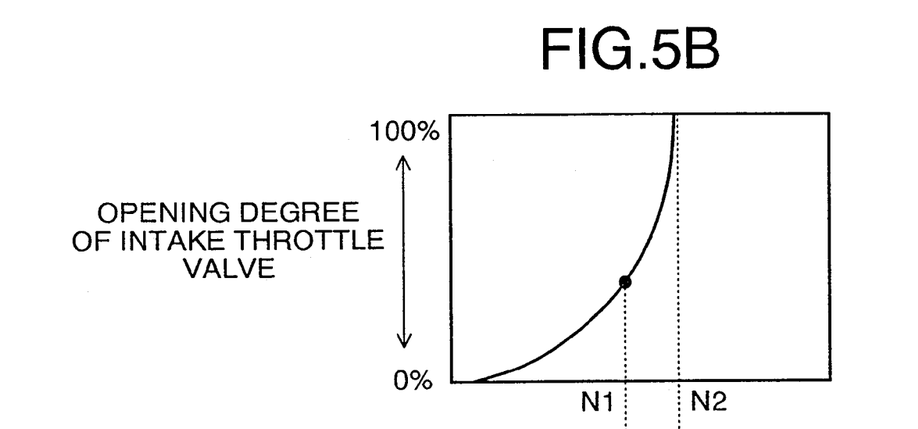
FIG. 5b illustrates the relationship between the intake air quantity and opening degree of the intake throttle valve.
Figure 5C:
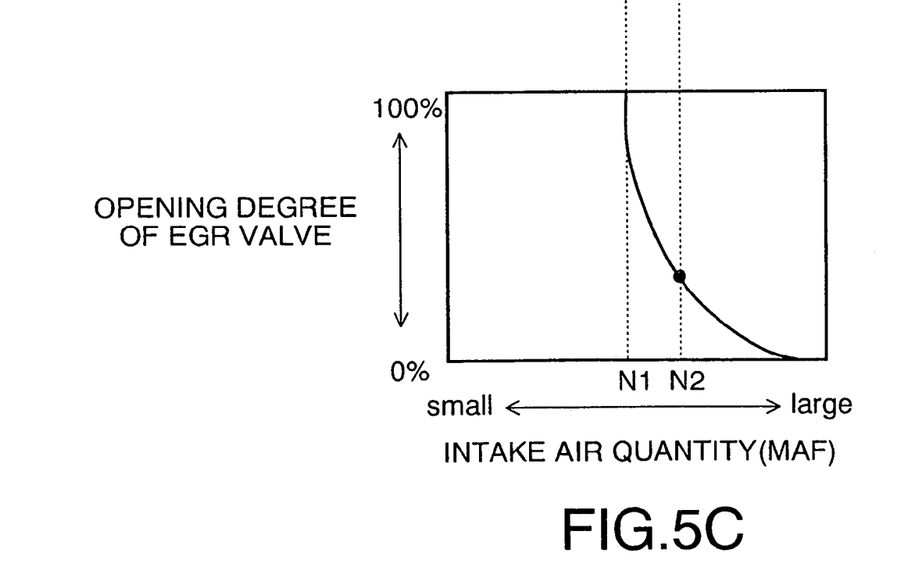
FIG. 5c illustrates the relationship between the intake air quantity and opening degree of the EGR valve.

In the figures, the intake air quantity is plotted against the abscissa, and the EGR ratio, valve opening degree of the intake throttle valve 13, and valve opening degree of the EGR valve 7 are plotted against the ordinate in FIG. 5a, FIG. 5b, and FIG. 5c, respectively.

As follows from FIG. 5a and FIG. 5b, if the valve opening degree of the intake throttle valve 13 gradually increases from the state of 0% (fully closed), the intake air quantity increases and the EGR ratio decreases. Further, if the intake air quantity rises to a certain value N1, the increase ratio in the intake air quantity with respect to changes in the valve opening degree of the intake throttle valve 13 becomes smaller and once the valve opening degree becomes 100% (fully open), the intake air quantity does not increase anymore.

On the other hand, as shown in FIG. 5a and FIG. 5c, if the valve opening degree of the EGR valve 7 gradually increases from the state of 0% (fully closed), the intake air quantity decreases and the EGR ratio increases. Further, if the intake air quantity drops to a certain value N2, the decrease ratio in the intake air quantity with respect to changes in the valve opening degree of the EGR valve 7 becomes smaller and once the valve opening degree becomes 100% fully open), the intake air quantity does not decrease anymore.

Thus, the intake throttle valve 13 and EGR valve 7 have respective regions with high sensitivity with respect to the intake air quantity (regions with high controllability). In other words, the intake throttle valve 13 demonstrates high controllability in a region where the intake air quantity is N1 or less, and the EGR valve 7 demonstrates controllability in a region where the intake air quantity is more than N2. Furthermore, the controllability of the intake throttle valve 13 and EGR valve 7 in the region with intermediate intake air quantity (N1 to N2) is not that high.

The diesel engine of the present embodiment is so designed that the intake air quantity can be controlled in a simple and adequate manner by considering the above-described characteristics of the intake throttle valve 13 and EGR valve 7. This is explained below in greater detail. When the target intake air quantity determined from the map is equal to or less than the first set value (N1 in FIG. 5b and FIG. 5c), the ECU 19 fixes the opening degree of the EGR valve 7 (usually, fixed to a fully open state) and controls the opening and closing of only the intake throttle valve 13. When the target intake air quantity is larger than the first set value N1 and equal to or less than the second set value (N2 in FIG. 5b and FIG. 5c), which is larger than the first set value N1, the ECU 19 controls the opening and closing of both the EGR valve 7 and the intake throttle valve 13. When the target intake air quantity is larger than the second set vale N2, the ECU 19 fixes the opening degree of the intake throttle valve 13 (usually fixes to a fully open state) and controls the opening and closing of only the EGR valve 7. Further, because the first set value N1 and second set value N2 vary depending on the characteristics of the EGR unit 5 (for example, performance of the EGR cooler 9), they are determined by preliminary tests.

With the present embodiment, in the region in which the intake throttle valve 13 or EGR valve 7 has a high sensitivity with respect to the intake air quantity (controllability is high), only the valve with a high sensitivity is controlled. Therefore, the intake air quantity can be controlled finely and in an easy manner. Furthermore, in the region where both the intake throttle valve 13 and the EGR valve 7 have a comparatively low sensitivity with respect to intake air quantity, a high controllability can be maintained by controlling both valves. Therefore, the intake air quantity can be reliably controlled. Moreover, because both the intake throttle valve 13 and the EGR valve 7 are used for controlling the intake air quantity, the range of possible control of the intake air quantity is expanded. Therefore, optimization of the ignition timing can be conducted reliably.

The present invention is not limited to the above-described embodiment.

For example, in the above-described embodiment, a variable-capacity turbo (VGS) 14 was described as a-variable supercharger, but the present invention is not limited to such a configuration and other variable superchargers such as a variable-nozzle turbo (VNT), two-stage turbo (system with switching between two turbo), or a variable turbo using a westgate may be used.

Further, in the operation region where the premix combustion is implemented, the control quantity (valve opening degree) of the boost pressure adjustment means (supercharge adjustment valve 17) may be constant, regardless of the engine operation state. As a result, the boost pressure becomes constant. Therefore, the control of intake air quantity with the intake throttle valve 13 and/or EGR valve 7 can be conducted even easier. Furthermore, in this case, if the boost pressure adjustment valve 17 is fixed in an almost fully open state, an effective supercharge response can be ensured in a transition from a low-load region where the premix combustion is implemented to a high load region where the usual combustion is implemented.

Furthermore, because the present invention does not use the boost pressure adjustment means for controlling the intake air quantity, it is also readily applicable to diesel engines that are not equipped with a variable supercharger.

Further, in the present embodiment, the target intake air quantity was determined based on the target oxygen quantity, but the present invention is not limited to such a procedure and the target intake air quantity may be also determined by using any one of the quantity of oxygen, oxygen concentration, air/fuel ratio, EGR ratio, and inert gas concentration, or a combination of two or more thereof, or other physical parameters corresponding thereto.

Moreover, in the present embodiment, the intake throttle valve 13 and/or EGR valve 7 were controlled so that the actual intake air quantity detected by the MAF sensor 11 becomes the target intake air quantity, but the ignition timing of the mixture can be detected by the cylinder pressure sensor and the intake throttle valve 13 and/or EGR valve 7 can be also so controlled that the actual ignition timing matches the predetermined optimum ignition timing.

Another possibility is to determine the target oxygen quantity necessary for igniting the fuel at the target timing based on the engine operation state, to provide $O_2$ (oxygen) sensor in the combustion chamber of the engine body 1 or in the intake port, and to control the intake throttle valve 13 and/or EGR valve 7 so that the actual oxygen quantity (quantity of oxygen contained in the mixture) detected with the $O_2$ sensor matches the target oxygen quantity.

What is claimed is:

1. A diesel engine comprising:
   an EGR (exhaust gas recirculation) valve;
   an intake throttle valve provided upstream of an EGR gas inlet portion in an intake channel;
   control means for controlling the EGR valve and the intake throttle valve; and
   intake air quantity detection means for detecting an intake air quantity upstream of an EGR gas inlet portion in the intake channel;
   wherein the diesel engine implements a premix combustion in which a fuel is injected earlier than a compression top dead center and ignited after the injection is completed at least in a prescribed operation region; and
   wherein the control means, at least in the operation region in which the premix combustion is implemented, determines a target intake air quantity necessary for igniting the fuel at a target timing based on an engine operation state and controls the intake throttle valve and the EGR valve so that the actual intake air quantity detected by the intake air quantity detection means matches the target intake air quantity.

2. The diesel engine according to claim 1, wherein target values of at least any one of quantity of oxygen, oxygen concentration, air/fuel ratio, EGR ratio, and inert gas concentration necessary for the fuel to be ignited at an optimum timing, or a combination of two or more thereof, or other physical parameters corresponding thereto are determined for each engine operation state, and the target intake air quantity is determined such that at least any one of the quantity of oxygen, the oxygen concentration, the air/fuel ratio, the EGR ratio, and the inert gas concentration, or a combination of two or more thereof, or other physical parameters corresponding thereto match the target values.

3. The diesel engine according to claim 1, wherein the control means:
fixes an opening degree of the EGR valve and controls opening and closing of only the intake throttle valve when the target intake air quantity is equal to or less than a first set value;
controls opening and dosing of both the EGR valve and the intake throttle valve when the target intake air quantity is larger than the first set value and equal to or less than a second set value; and
fixes an opening degree of the intake throttle valve and controls opening and closing of only the EGR valve when the target intake air quantity is larger than the second set value.

4. The diesel engine according to claim 3, wherein the control means:
fixes the opening degree of the EGR valve to a full open state and controls the opening and closing of only the intake throttle valve when the target intake air quantity is equal to or less than the first set value; and
fixes the opening degree of the intake throttle valve to a full open state and controls the opening and dosing of only the EGR valve when the target intake air quantity is larger than the second set value.

5. The diesel engine according to claim 1, wherein the diesel engine further comprises a variable supercharger equipped with boost pressure adjustment means, and the control means controls the boost pressure adjustment means according to a map that was set in advance, irrespectively of the target intake air quantity.

6. The diesel engine according to claim 5, wherein the control means makes a control amount of the boost pressure adjustment means constant in the operation region where the premix combustion is implemented.

7. The diesel engine according to claim 6, wherein the boost pressure adjustment means comprises a boost pressure adjustment valve for changing a flow rate of exhaust gas introduced into an exhaust turbine provided in an exhaust channel, and the control means fixes the boost pressure adjustment valve to a fully closed state in the operation region where the premix combustion is implemented.

8. A control method for a diesel engine comprising an EGR valve, an intake throttle valve provided upstream of an EGR gas inlet portion in an intake channel, control means for controlling the EGR valve and the intake throttle valve, and intake air quantity detection means for detecting an intake air quantity upstream of an EGR gas inlet portion in the intake channel, the diesel engine implementing a premix combustion in which a fuel is injected earlier than a compression top dead center and ignited after the injection is completed at least in a prescribed operation region, the method comprising the steps of:
determining a target intake air quantity necessary for igniting the fuel at a target timing based on an engine operation state; and
controlling the intake throttle valve and the EGR valve so that the actual intake air quantity detected by the intake air quantity detection means matches the target intake air quantity.

9. A diesel engine comprising:
an EGR valve;
an intake throttle valve provided upstream of an EGR gas inlet portion in an intake channel;
control means for controlling the EGR valve and the intake throttle valve; and oxygen quantity detection means for detecting an oxygen quantity in a gas mixture;
wherein the diesel engine implements a premix combustion in which a fuel is injected earlier than a compression top dead center and ignited after the injection is completed at least in a prescribed operation region; and
wherein the control means, at least in the operation region in which the premix combustion is implemented, determines a target oxygen quantity necessary for igniting the fuel at a target timing based on an engine operation state and controls the intake throttle valve and the EGR valve so that the actual oxygen quantity detected by the oxygen quantity detection means matches the target oxygen quantity.

10. A control method for a diesel engine comprising an EGR valve, an intake throttle valve provided upstream of an EGR gas inlet portion in an intake channel, control means for controlling the EGR valve and the intake throttle valve, and oxygen quantity detection means for detecting an oxygen quantity in a gas mixture, the diesel engine implementing a premix combustion in which a fuel is injected earlier than a compression top dead center and ignited after the injection is completed at least in a prescribed operation region, the method comprising the steps of:
determining a target oxygen quantity necessary for igniting the fuel at a target timing based on an engine operation state; and
controlling the intake throttle valve and the EGR valve so that the actual oxygen quantity detected by the oxygen quantity detection means matches the target oxygen quantity.

11. A diesel engine comprising:
an EGR (exhaust gas recirculation) valve;
an intake throttle valve provided upstream of an EGR gas inlet portion in an intake channel;
control means for controlling the EGR valve and the intake throttle valve; and
intake air quantity detection means for detecting an intake air quantity upstream of an EGR gas inlet portion in the intake channel;
wherein the diesel engine implements a premix combustion in which a fuel is injected earlier than a compression top dead center and ignited after the injection is completed at least in a prescribed operation region;
wherein the control means, at least in the operation region in which the premix combustion is implemented, determines a target intake air quantity necessary for igniting the fuel at a target timing based on an engine operation state and controls the intake throttle valve and/or the EGR valve so that the actual intake air quantity detected by the intake air quantity detection means matches the target intake air quantity; and
wherein the control means:
fixes an opening degree of the EGR valve and controls opening and closing of only the intake throttle valve when the target intake air quantity is equal to or less than a first set value;
controls opening and closing of both the EGR valve and the intake throttle valve when the target intake air quantity is larger than the first set value and equal to or less than a second set value; and
fixes an opening degree of the intake throttle valve and controls opening and closing of only the EGR valve when the target intake air quantity is larger than the second set value.

12. The diesel engine according to claim 11, wherein the control means:

fixes the opening degree of the EGR valve to a full open state and controls the opening and closing of only the intake throttle valve when the target intake air quantity is equal to or less than the first set value; and fixes the opening degree of the intake throttle valve to a full open state and controls the opening and dosing of only the EGR valve when the target intake air quantity is larger than the second set value.

13. A diesel engine comprising:

an EGR (exhaust gas recirculation) valve;

an intake throttle valve provided upstream of an EGR gas inlet portion in an intake channel;

control means for controlling the EGR valve and the intake throttle valve;

intake air quantity detection means for detecting an intake air quantity upstream of an EGR gas inlet portion in the intake channel; and a variable supercharger equipped with boost pressure adjustment means;

wherein the diesel engine implements a premix combustion in which a fuel is injected earlier than a compression top dead center and ignited after the injection is completed at least in a prescribed operation region;

wherein the control means, at least in the operation region in which the premix combustion is implemented, determines a target intake air quantity necessary for igniting the fuel at a target timing based on an engine operation state and controls the intake throttle valve and/or the EGR valve so that the actual intake air quantity detected by the intake air quantity detection means matches the target intake air quantity; and wherein the control means controls the boost pressure adjustment means according to a map that was set in advance, irrespectively of the target intake air quantity.

14. The diesel engine according to claim 13, wherein the control means makes a control amount of the boost pressure adjustment means constant in the operation region where the premix combustion is implemented.

15. The diesel engine according to claim 14, wherein the boost pressure adjustment means comprises a boost pressure adjustment valve for changing a flow rate of exhaust gas introduced into an exhaust turbine provided in an exhaust channel, and the control means fixes the boost pressure adjustment valve to a fully closed state in the operation region where the premix combustion is implemented.

* * * * *

UNITED STATES PATENT AND TRADEMARK OFFICE
CERTIFICATE OF CORRECTION

PATENT NO. : 7,188,606 B2 Page 1 of 1
APPLICATION NO. : 11/068953
DATED : March 13, 2007
INVENTOR(S) : Naoya Ishikawa It is certified that error appears in the above-identified patent and that said Letters Patent is hereby corrected as shown below:

Column 11, Claim 4, line 8, please delete the word "dosing" and replace with --closing--.

Signed and Sealed this

Twenty-second Day of May, 2007

JON W. DUDAS
*Director of the United States Patent and Trademark Office*